(12) United States Patent
Gilicinski et al.

(10) Patent No.: US 7,066,970 B2
(45) Date of Patent: Jun. 27, 2006

(54) ELECTROCHEMICAL CELLS

(75) Inventors: Andrew G. Gilicinski, Westborough, MA (US); Yichun Wang, Canton, MA (US)

(73) Assignee: The Gillette Company, Boston, MA (US)

( * ) Notice: Subject to any disclaimer, the term of this patent is extended or adjusted under 35 U.S.C. 154(b) by 325 days.

(21) Appl. No.: 10/434,592

(22) Filed: May 9, 2003

(65) Prior Publication Data

US 2004/0224228 A1 Nov. 11, 2004

(51) Int. Cl.
*H01M 6/00* (2006.01)
*H01M 4/00* (2006.01)
*H01M 4/86* (2006.01)
*H01M 4/62* (2006.01)
*H01M 4/50* (2006.01)

(52) U.S. Cl. .......................... 29/623.1; 429/27; 429/42; 429/217; 429/224

(58) Field of Classification Search ................ 429/217, 429/42, 224, 27; 29/623.1, 623.3
See application file for complete search history.

(56) References Cited

U.S. PATENT DOCUMENTS

| | | | |
|---|---|---|---|
| 2,463,316 A | 3/1949 | Ruben | 429/145 |
| 2,605,300 A | 7/1952 | Shirland, Jr. | 429/217 |
| 3,023,262 A | 2/1962 | Emmerling et al. | 429/217 |
| 3,248,267 A | 4/1966 | Langer et al. | 502/159 |
| 3,423,247 A | 1/1969 | Darland, Jr. et al. | 429/40 |
| 3,854,999 A | 12/1974 | Thornton | 264/104 |
| 3,943,004 A | 3/1976 | Honer et al. | 429/119 |
| 4,333,993 A * | 6/1982 | Gibbard | 429/27 |
| 4,444,852 A | 4/1984 | Liu et al. | 429/29 |
| 5,185,218 A | 2/1993 | Brokman et al. | 429/27 |
| 5,480,735 A | 1/1996 | Landsman et al. | 429/13 |

FOREIGN PATENT DOCUMENTS

| | | |
|---|---|---|
| GB | 429840 | 6/1935 |
| JP | 55111065 | 8/1980 |
| WO | WO 98/38687 | 9/1998 |

OTHER PUBLICATIONS

"Waxes," Encyclopedia of Chemical Technology, vol. 25, 4th edition, pp. 614-626.

* cited by examiner

*Primary Examiner*—Patrick Joseph Ryan
*Assistant Examiner*—Thomas H. Parsons
(74) *Attorney, Agent, or Firm*—Fish & Richardson P.C.

(57) ABSTRACT

Electrochemical cells and methods of making cells are disclosed. In some embodiments, an electrochemical cell includes a housing, a negative electrode in the housing, a positive electrode in the housing, the positive electrode including a wax, and a separator between the negative and positive electrodes.

29 Claims, 1 Drawing Sheet

FIGURE
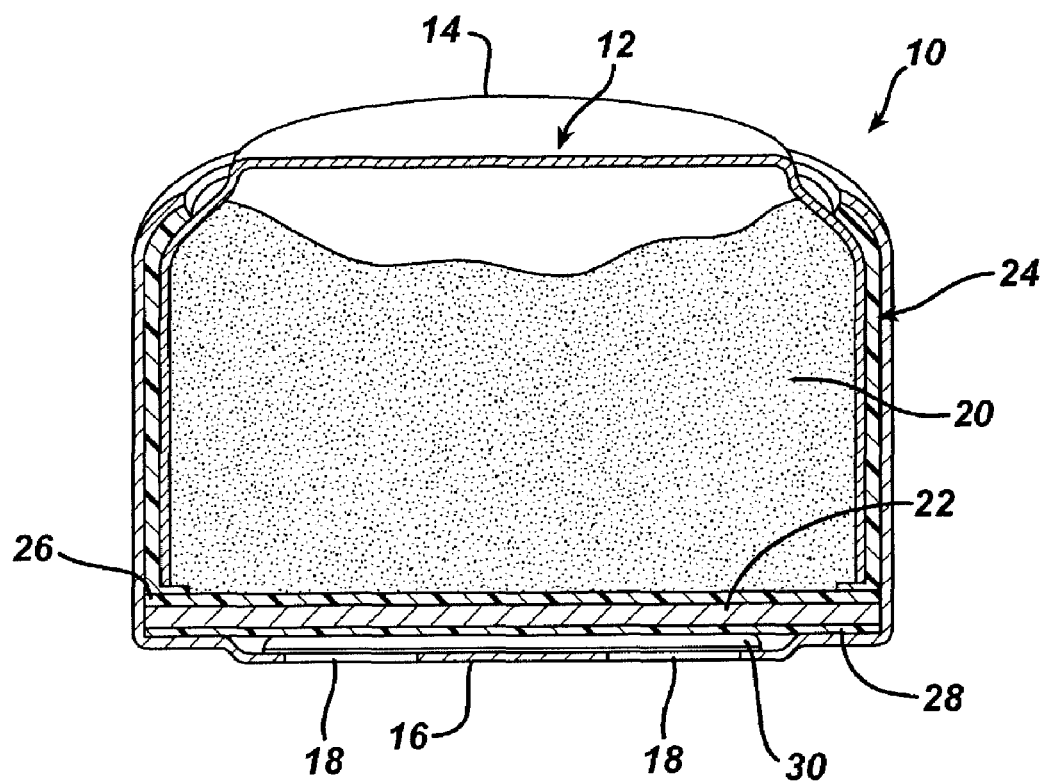

ELECTROCHEMICAL CELLS

FIELD OF THE INVENTION

The invention relates to electrochemical cells, such as metal-air cells, and methods of making the cells.

BACKGROUND

Electrochemical cells are commonly used as electrical energy sources. Generally, a cell contains a negative electrode and a positive electrode. The negative electrode contains an active material (e.g., zinc particles) that can be oxidized; and the positive electrode contains an active material (e.g., manganese dioxide) that can be reduced. The active material of the negative electrode is capable of reducing the active material of the positive electrode. In order to prevent direct reaction of the active material of the negative electrode and the active material of the positive electrode, the electrodes are electrically isolated from each other by a separator.

When a cell is used as an electrical energy source in a device, electrical contact is made to the electrodes, allowing electrons to flow through the device and permitting the respective oxidation and reduction reactions to occur to provide electrical power. An electrolytic solution (e.g., a potassium hydroxide solution) in contact with the electrodes contains ions that flow through the separator between the electrodes to maintain charge balance throughout the cell during discharge.

In one type of electrochemical cell, called a metal-air cell, oxygen is reduced at the positive electrode, and a metal is oxidized at the negative electrode. Oxygen can be supplied to the cathode from the atmospheric air external to the cell through one or more air hole(s) in a cell housing.

SUMMARY

In one aspect, the invention features an electrochemical cell, such as a metal-air cell, including a positive electrode having a wax. As described below, the wax can enhance the performance of the cell, such as by increasing the shelf life of the cell. For example, at low humidity, the wax can provide a barrier that reduces evaporation of liquid in the cell ("dry out"), and that reduces the occurrence of carbonation (e.g., formation of a carbonate from a hydroxide electrolytic solution). At high humidity, the wax can provide a barrier that reduces the amount of water from the air that can diffuse into the cell, condense, and flood the cell. Both carbonation and flooding can block catalytic sites in the positive electrode, thereby lowering the performance of the cell. The wax can also seal cracks or voids in the positive electrode, which can enhance the mechanical properties, e.g., strength, of the electrode.

In another aspect, the invention features an electrochemical cell including a housing, a negative electrode in the housing, a positive electrode in the housing, the positive electrode including a catalyst and a wax, and a separator between the negative and positive electrodes.

Embodiments may include one or more of following features. The positive electrode has a first portion including a first concentration of wax, and a second portion having a second concentration of wax less than the first concentration. The second portion is between the first portion and the negative electrode. The positive electrode has a first portion including the wax, and a second portion substantially free of the wax.

The positive electrode can have a first portion including the wax, the first portion being less than about 0.1 mm thick. The positive electrode can have a first portion including the wax, the first portion having a thickness less than about 20% of the thickness of the positive electrode. The positive electrode can have less than about 20% of the wax by weight.

The positive electrode can have a first portion and a second portion outwardly disposed relative to the first portion, the first portion having a lower concentration of wax than the second portion. The positive electrode can have an interior surface substantially free of the wax. The positive electrode can have a first layer including the wax and a second layer substantially free of the wax, the second layer being between the first layer and the negative electrode. The positive electrode can include a first layer having a first concentration of the wax, and a second layer having a second concentration less than the first concentration of the wax, the second layer being between the first layer and the negative electrode.

The wax can be distributed substantially throughout the positive electrode.

The wax can include hexatriacontane, octacosane, carnauba wax, beeswax, China wax, and/or montan wax.

The positive electrode can further include a binder. The catalyst can include manganese oxide, and the binder can include polytetrafluoroethylene.

The cell can be a metal-air cell, an air-assist cell, or an alkaline cell.

In another aspect, the invention features a electrochemical cell including a housing defining an air access opening, a negative electrode in the housing, the negative electrode including zinc, a positive electrode in the housing, the positive electrode including manganese oxide and a wax, and a separator between the negative electrode and the positive electrode.

Embodiments may include one or more of the following features. The positive electrode has a first portion including manganese oxide and the wax, and a second portion including manganese oxide and being substantially free of the wax, the second portion being between the first portion and the negative electrode. The positive electrode has a first portion including manganese oxide and a first concentration of wax, and a second portion including manganese oxide and a second concentration of wax less than the first concentration, the second portion being between the first portion and the negative electrode. The positive electrode has less than about 20% of the wax by weight. The wax can include a material such as hexatriacontane, octacosane, carnauba wax, beeswax, China wax, and/or montan wax. The cell can be a metal-air cell or an air-assisted cell.

In another aspect, the invention features a method of making an electrochemical cell. The method includes incorporating a wax into a portion of a positive electrode having a catalyst, and incorporating the positive electrode into the cell.

The method can further include melting the wax; applying solid wax on a surface of the positive electrode; contacting a substrate comprising the wax with the positive electrode; and/or laminating the wax to the positive electrode.

Other aspects, features, and advantages of the invention will be apparent from the drawing, description, and claims.

DESCRIPTION OF THE DRAWING

The FIGURE is a cross-sectional view of an electrochemical cell.

DETAILED DESCRIPTION OF THE PREFERRED EMBODIMENTS

Referring to the FIGURE, an electrochemical cell 10 (as shown, a metal-air button cell) includes a housing 12 defined by a negative electrode can 14 and a positive electrode can 16 crimped together to can 14. Positive electrode can 16 has one or more air access openings 18 to allow air to exchange into and out of cell 10. Within housing 12, cell 10 contains a negative electrode 20 and a positive electrode 22. An electrolytic solution, such as KOH, is dispersed throughout cell 10 to provide charge balance.

Cell 10 further includes an insulator 24, a separator 26, a membrane 28, and an air disperser 30. Insulator 24 is located between the cans 14 and 16 such that the cans may serve as the negative and positive terminals of cell 10, respectively. Separator 26 is located between negative electrode 20 and positive electrode 22, thereby preventing electrical contact between the electrodes. Membrane 28 helps prevent an electrolyte in negative electrode 20 from leaking out of cell 10. Air disperser 30 is located between air access openings 18 and positive electrode 22.

Positive electrode 22 includes a positive electrode plaque and a wax. The positive electrode plaque can be a relatively porous structure composed of a hardened blend of a catalyst, carbon particles, and a binder. In certain embodiments, the wax forms a layer below the exterior surface of positive electrode 22. The exterior surface of positive electrode 22 is the surface that is next to membrane 28 as shown in FIG. 1, vis-à-vis the interior surface that is shown next to separator 26.

Without wishing to be bound by theory, the wax can enhance the performance of cell 10, such as by increasing the shelf life of the cell. For example, at low humidity, the wax can provide a barrier that reduces the amount of water from the electrolytic solution that can diffuse through positive electrode 22 and evaporate from cell 10. Loss of water can dry out cell 10 and concentrate the electrolyte, such as potassium hydroxide. The concentrated potassium hydroxide is more likely to react with carbon dioxide entering cell 10, and form potassium carbonate, which can block catalytic sites of positive electrode 22 and thus block oxygen transfer between the air and the catalytic sites. Consequently, the performance of cell 10 is lowered. At high humidity, the wax can provide a barrier that reduces the amount of water from the air that can diffuse into cell 10 and condense on positive electrode 22. The condensed water can prevent oxygen from reaching the catalytic sites of positive electrode and/or flood the positive electrode, both of which can lower the performance of cell 10.

In preferred embodiments, the wax is a substance that is a plastic solid at ambient temperature (e.g., a cell's operating temperature) and that, on being subjected to relatively high temperatures (e.g., greater than about 80° C.), becomes a low viscosity liquid. The wax can include a hydrocarbon material having hydrophobic properties. The hydrophobicity of the wax can help prevent (e.g., repel) water from diffusing through positive electrode 22. At the same time, the wax allows oxygen from the air to diffuse to positive electrode 22, e.g., to a degree that the performance of the cell is not substantially adversely affected. For example, a positive electrode having a wax can have at least 70% (e.g., about $\geq 75\%$, about $\geq 80\%$, about $\geq 85\%$, about $\geq 90\%$, or about $\geq 95\%$) of the current density of a substantially identical electrode not having a wax. Examples of waxes include normal hydrocarbons (e.g., alkanes) to materials that are mixtures of hydrocarbons and reactive functional species. Suitable waxes include hexatriacontane ($C_{36}H_{74}$), octacosane, carnauba wax powder (Strahl & Pitsch, Inc.), beeswax, China wax, and montan wax. Other waxes are described in the *Encyclopedia of Chemical Technology*, $4^{th}$ edition, Volume 25, pages 614–626. In some embodiments, the wax is a solid at room temperature and has a melting point of about 80° C. or higher, e.g., about 100° C. or higher. In some embodiments, the wax has viscosity in the range of about 50 to about 3500 $mm^2/s$ (cSt) when the wax is melted. Mixtures of two or more waxes can be used in a positive electrode.

The wax can be applied to the positive electrode plaque using conventional techniques. For example, powders or particles of wax can be applied to the positive electrode plaque using techniques such as powder coating, spray coating, electrostatic spraying, and/or brush coating. The size of the powder can range from about 10 nanometers to about 1 mm. Subsequently, the wax can be air dried, as needed, and melted, for example, by placing the wax-coated plaque in an oven and heating the plaque to above the melting temperature of the wax (e.g., about 100° C. for about five minutes). As a result, the melted wax can penetrate into the pores and/or channels of the positive electrode plaque (e.g., the exterior side of the plaque). When the electrode plaque is removed from heating, the wax can solidify inside the plaque. Alternatively or in addition, wax on a substrate, such as wax paper, can be applied (e.g., laminated) to electrode plaque. The laminated plaque can be heated to allow the wax to penetrate the plaque, and after cooling and solidification, the substrate can be removed (e.g., peeled off). In other embodiments, more than one wax application can be performed. For example, multiple layers or strata of waxes having different compositions, different thicknesses, increasing or decreasing hydrophobicity, etc, can be applied using multiple applications.

The amount of wax in positive electrode 22 can vary. The amount of wax can be a function of, for example, the type of wax, the method used to apply the wax, the type of electrochemical cell, the desired performance, and/or viscosity. In some embodiments, positive electrode 22 includes less than 20% of the wax by weight. For example, positive electrode 22 can include more than or equal to 2%, 4%, 6%, 8%, 10%, 12%, 14%, 16%, or 18% of the wax by weight; and/or less than or equal to 20%, 18%, 16%, 14%, 12%, 10%, 8%, 6%, 4%, or 2% of the wax by weight. In some cases, the wax is less about 0.1 mm thick (e.g., less than about 0.08 mm, 0.06 mm, 0.04 mm, 0.02 mm, or 0.01 mm). The wax can have a thickness of less than about 20% (e.g., less than about 18%, 16%, 14%, 12%, 10%, 8%, 6%, 4%, or 2%) of the total thickness of positive electrode 22.

The wax can be applied to any portions of positive electrode 22. For example, the wax can be applied to the entire exterior surface and/or the entire interior surface of positive electrode 22. The wax can be applied to only selected portions of positive electrode 22. For example, portions of electrode 22 adjacent to air access openings 18 can include a wax, while other portions can be substantially free of the wax. Portions close to openings 18 can have relatively large amounts of wax, while portions farther from the openings can have less or decreasing levels of wax. The amount of wax applied to positive electrode 22 can be varied, for example, by using multiple application steps with appropriate masking techniques. In certain embodiments, the wax (e.g., wax powder) can be blended with a positive electrode mixture (described below) such that the wax is dispersed throughout positive electrode 22. In some cases, a layer of wax can be applied on the surface of the positive electrode without melting the wax into the electrode, e.g., if the wax is sufficiently porous that it does not adversely affect air diffusion.

In some embodiments, the wax forms one or more discrete portions (e.g., layers) between the interior and exterior surfaces of the positive electrode plaque. For example, a layer of wax can be applied to a first positive electrode plaque as described above. The layer of wax can be melted into the first plaque, or the layer can be unmelted. The wax-containing first plaque can then be bonded to a second positive electrode plaque to form a final positive electrode plaque. Techniques for bonding include pressing, lamination, and/or heated calendering, as described in U.S. Pat. No. 6,368,365. The steps described above can be repeated to form an electrode plaque having two or more portions or layers of wax. The portions of the wax can have the same or different compositions, thicknesses, coverage, etc.

Turning now to the positive electrode plaque, the plaque can be formed by blending a catalyst, carbon particles and binder to form a positive electrode mixture, and coating the mixture on a current collector, such as a metal mesh screen. After the positive electrode mixture has hardened, the mixture can be heated to remove any residual volatiles. When positive electrode 22 is incorporated into cell 10, the current collector can be placed in electrical contact with positive electrode can 16.

The active positive electrode mixture can include a catalyst for reducing oxygen, such as a manganese compound, carbon particles, and a binder. Suitable catalysts include manganese oxides, such as $Mn_2O_3$, $Mn_3O_4$, and $MnO_2$, that can be prepared, for example, by heating manganese nitrate or by reducing potassium permanganate. Positive electrode mixture can include between about 0% and about 10%, such as between about 3% and about 5%, of catalyst by weight. Mixtures of different catalysts can be used.

The carbon particles are not limited to any particular type of carbon. Examples of carbon include Black Pearls 2000, Vulcan XC-72 (Cabot Corp., Billerica, Mass.), Shawinigan Black (Chevron, San Francisco, Calif.), Printex, Ketjen Black (Akzo Nobel, Chicago, Ill.), and Calgon PWA (Calgon Carbon, Pittsburgh, Pa.). The positive electrode mixture can include between about 30% and about 70%, such as between about 50% and about 60%, of carbon by weight. Mixtures of different carbon particles can be used.

Examples of binders include polyethylene powders, polyacrylamides, Portland cement and fluorocarbon resins, such as polyvinylidene fluoride and polytetrafluoroethylene. An example of a polyethylene binder is sold under the tradename Coathylene HA-1681 (Hoechst). The positive electrode mixture can include between about 10% and 40%. For example, the mixture can have greater than or equal to about 10%, 15%, 20%, 25%, 30%, or 35% of binder by weight; and/or less than or equal to about 40%, 35%, 30%, 25%, 20%, or 15% of binder by weight.

In some embodiments, a portion of or all of the binder is replaced by one or more waxes. For example, if the porosity of the positive electrode plaque can be maintained to provide sufficient air diffusion (e.g., no aggregation of the waxes or clogging of the pores), the positive electrode mixture can include up to about 40% of one or more waxes. Of the total amount of binder and wax in the positive electrode plaque, the wax can compose greater than or equal to about 10%, 20%, 30%, 40%, 50%, 60%, 70%, 80%, 90%, or 100%, and/or less than or equal to about 100%, 90%, 80%, 70%, 60%, 50%, 40%, 30%, 20%, or 10%.

On the exterior side of positive electrode 22, membrane 28 is placed adjacent to the positive electrode. Membrane 28 is air-permeable and substantially liquid-impermeable. Membrane 28, e.g., a PTFE membrane, helps maintain a consistent humidity level in cell 10. Membrane 28 also helps to prevent the electrolyte from leaking out of cell 10 and $CO_2$ from entering the cell.

Air dispenser 30 is adjacent to membrane 28. Air dispenser 30 can be a porous or fibrous material, such as porous paper, that helps maintain an air diffusion space between membrane 28 and positive electrode can 16.

On the interior side of positive electrode 22, separator 26 is placed adjacent to the positive electrode. Separator 26 can be a porous, electrically insulating polymer, such as polypropylene, that allows electrolyte to contact positive electrode 22.

Negative electrode 20 is on the other side of separator 26. Negative electrode 20 contains a mixture of zinc and electrolyte. The mixture of zinc and electrolyte can include a gelling agent that can help reduce leakage of the electrolyte from the cell and suspend the particles of zinc within the negative electrode.

The zinc material can be a zinc powder that is alloyed with lead, indium, aluminum, or bismuth. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. The zinc material can include lead, indium and aluminum, lead and indium, or lead and bismuth. Alternatively, the zinc can include lead without another metal additive. The zinc material can be air blown or spun zinc. Suitable zinc particles are described, for example, in U.S. Ser. No. 09/156,915, filed Sep. 18, 1998 (now U.S. Pat. No. 6,521,378), U.S. Ser. No. 08/905,254, filed Aug. 1, 1997 (now U.S. Pat. No. 6,284,410), and U.S. Ser. No. 09/115,867, filed Jul. 15, 1998 (now abandoned), each of which is incorporated by reference in its entirety.

The particles of the zinc can be spherical or nonspherical. For example, the zinc particles can be acicular in shape (having an aspect ratio of at least two). The zinc material includes a majority of particles having sizes between 60 mesh and 325 mesh. For example, the zinc material can have the following particle size distribution:

0–3 wt % on 60 mesh screen;
40–60 on 100 mesh screen;
30–50 wt % on 200 mesh screen;
0–3 wt % on 325 mesh screen; and
0–0.5 wt % on pan.

Suitable zinc materials include zinc available from Union Miniere (Overpelt, Belgium), Duracell (USA), Noranda (USA), Grillo (Germany), or Toho Zinc (Japan).

The gelling agent can be an absorbent polyacrylate. The absorbent polyacrylate has an absorbency envelope of less than about 30 grams of saline per gram of gelling agent, measured as described in U.S. Pat. No. 4,541,871, incorporated herein by reference. The negative electrode gel can include less than 1 percent of the gelling agent by dry weight of zinc in the negative electrode mixture. The gelling agent content can be between about 0.2 and 0.8 percent by weight, such as between about 0.3 and 0.6 percent by weight, or about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507,438.

In certain embodiments, negative electrode 20 can include a non-ionic surfactant. The surfactant can be a non-ionic phosphate surfactant, such as a non-ionic alkyl phosphate or a non-ionic aryl phosphate (e.g., RA600 or RM510, available from Rohm & Haas) coated on a zinc surface. Negative electrode 20 can include between about 20 and 100 ppm of the surfactant coated onto the surface of the zinc material. The surfactant can serve as a gassing inhibitor.

The electrolyte can be an aqueous alkaline solution, such as a solution of potassium hydroxide. The electrolyte can include between about 30 and 40 percent, such as between 35 and 40 of potassium hydroxide. The electrolyte can also include between about 1 and 2 percent of zinc oxide.

In some embodiments, negative electrode can 12 includes a tri-clad or bi-clad material. The bi-clad material can be stainless steel with an inner surface of copper. The tri-clad material can be composed of stainless steel having a copper layer on the inner surface of the can and a nickel layer on the outer surface of the can. Negative electrode can 12 may include a surface having tin or its alloys or other agents on the inner surface in contact with negative electrode 20. The tin can be on the inside surface of negative electrode can 12 that makes contact with negative electrode 20 and the electrolyte. The tin may be a continuous layer on the inner surface of the can. The tin layer may be a plated layer having a thickness between about 1 and 12 microns, such as between about 2 and 7 microns, or about 4 microns. The tin may be pre-plated on the metal strip or post-plated on negative electrode can 12. For example, the tin can be deposited by immersion plating (e.g., using a plating solution available from Technics, Rhode Island). The plated layer can have a bright finish or a matte finish. The coating may also include silver or gold compounds.

Positive electrode can 16 may include cold-rolled steel having inner and outer layers of nickel. Insulator 24, such as an insulating gasket, is pressure-fitted between negative electrode can 14 and positive electrode can 16. The gasket can be thinned to increase the capacity of the cell.

The configuration of housing may have a straight wall design, in which the side wall of negative electrode can 14 is straight, or a foldover design. The foldover design can be used for thinner-walled cans, e.g., those having a thickness of about 4 microns or less. In a foldover design, the clip-off edge of negative electrode can 14, which is generated during stamping of the can, is placed on the top, outside of the can, away from the interior of the cell. The foldover design can reduce potential gas generation by decreasing the possibility of zinc making contact with exposed stainless steel at the negative electrode can clip-off edge. A straight wall design can be used in conjunction with an L- or J-shaped insulator, which can bury the clip-off edge into the insulator foot. When a foldover design is used, the insulator can be L-shaped.

Overall cell height and diameter dimensions are specified by the International Electrotechnical Commission (IEC). For example, a button cell can have a variety of sizes: a 675 cell (IEC designation "PR44") has a diameter between about 11.25 and 11.60 millimeters and a height between about 5.0 and 5.4 millimeters; a 13 cell (IEC designation "PR48") has a diameter between about 7.55 and 7.9 millimeters and a height between about 5.0 and 5.4 millimeters; a 312 cell (IEC designation "PR41") has a diameter between about 7.55 and 7.9 millimeters and a height of between about 3.3 and 3.6 millimeters; and a 10 cell (IEC designation "PR70") has a diameter between about 5.55 and 5.80 millimeters and a height between about 3.30 and 3.60 millimeters. A 5 cell has a diameter between about 5.55 and 5.80 millimeters and a height between about 2.03 and 2.16 millimeters. Cell 10 can have an negative electrode can thickness of about 0.1016 mm. Cell 10 can have a positive electrode can thickness of about 0.1016 mm.

During storage, air access openings 18 can be covered by a removable sheet, sometimes known as a seal tab, that is provided on the bottom of positive electrode can 16 to cover the air access openings to restrict the flow of air between the interior and exterior of cell 10. A user peels the seal tab from positive electrode can 16 prior to use to activate the cell. This allows oxygen from the air to enter the interior of cell 10 from the external environment.

Other embodiments of metal-air cells can be used. Suitable examples are described in, for example, in U.S. Pat. No. 6,492,046; and commonly assigned U.S. Ser. No. 09/773,962, filed Feb. 1, 2001 (now abandoned).

Cell 10 can be other types of cells, such as air-assisted cells and alkaline cells. Suitable examples of air-assisted cells are described in U.S. Pat. Nos. 6,372,370; 6,399,243; and 6,270,921. Alkaline cells are described in U.S. Pat. No. 6,440,181; and commonly assigned U.S. Ser. No. 09/829,709, filed Apr. 10, 2001, and U.S. Ser. No. 09/658,042, filed Sep. 7, 2000 (now U.S. Pat. No. 6,858,349).

Cell 10 can be, for example, a AA, AAA, AAAA, C, or D battery. In other embodiments, cell 10 can be non-cylindrical, such as coin cell, prismatic cells, or racetrack shaped cells.

All references, such as patent applications, publications, and patents, referred to herein are incorporated by reference in their entirety.

Other embodiments are in the claims.

What is claimed is:

1. An electrochemical cell, comprising:
a housing;
a negative electrode in the housing;
a positive electrode in the housing; and
a separator between the negative and positive electrodes, wherein the positive electrode has a first portion comprising a catalyst and a first concentration of wax, and a second portion comprising a catalyst and a second concentration of wax, the second concentration being different than the first concentration.

2. The cell of claim 1, wherein second concentration is less than the first concentration.

3. The cell of claim 2, wherein the second portion is between the first portion and the negative electrode.

4. The cell of claim 1, wherein the second portion is substantially free of the wax.

5. The cell of claim 4, wherein the second portion is between the first portion and the negative electrode.

6. The cell of claim 1, wherein the first portion is less than about 0.1 mm thick.

7. The cell of claim 1, wherein the first portion has a thickness less than about 20% of the thickness of the positive electrode.

8. The cell of claim 1, wherein second portion is outwardly disposed relative to the first portion, the first portion having a lower concentration of wax than the second portion.

9. The cell of claim 1, wherein the positive electrode has an interior surface substantially free of the wax.

10. The cell of claim 1, wherein the positive electrode has a first layer comprising the wax and a second layer substantially free of the wax, the second layer being between the first layer and the negative electrode.

11. The cell of claim 1, wherein the positive electrode includes a first layer having a first concentration of the wax, and a second layer having a second concentration less than the first concentration of the wax, the second layer being between the first layer and the negative electrode.

12. The cell of claim 1, wherein the wax is distributed substantially throughout the positive electrode.

13. The cell of claim 1, wherein the positive electrode comprises less than about 20% of the wax by weight.

14. The cell of claim 1, wherein the positive electrode comprises less than about 10% of the wax by weight.

15. The cell of claim 1, wherein the positive electrode comprises less than about 5% of the wax by weight.

16. The cell of claim 1, wherein the wax comprises a material selected from the group consisting of hexatriacontane, octacosane, carnauba wax, beeswax, China wax, and montan wax.

17. The cell of claim 1, wherein the positive electrode further comprises a binder.

18. The cell of claim 17, wherein the catalyst comprises manganese oxide, and the binder comprises polytetrafluoroethylene.

19. The cell of claim 17, wherein the binder is selected from the group consisting of polyethyelene, polyacrylamide, fluorocarbons, and mixtures thereof.

20. The cell of claim 1, wherein the cell is a metal-air cell.

21. The cell of claim 1, wherein the cell is an air-assist cell.

22. The cell of claim 1, wherein the cell is an alkaline cell.

23. The cell of claim 1, wherein the catalyst comprises manganese oxide.

24. The cell of claim 1, wherein the second concentration of wax is 0% wax by weight.

25. A method of making an electrochemical cell, comprising:
    incorporating a wax into a positive electrode such that the positive electrode has a first portion comprising a catalyst and a first concentration of wax, and a second portion comprising a catalyst and a second concentration of wax, the second concentration being different from the first concentration; and
    incorporating the positive electrode into the cell.

26. The method of claim 25, further comprising melting the wax.

27. The method of claim 25, further comprising applying solid wax on a surface of the positive electrode.

28. The method of claim 25, further comprising contacting a substrate comprising the wax with the positive electrode.

29. The method of claim 25, further comprising laminating the wax to the positive electrode.

* * * * *